United States Patent [19]

Cocks

[11] 4,351,364

[45] Sep. 28, 1982

[54] STEEL REINFORCED PIPE

[75] Inventor: Philip J. Cocks, Nuneaton, England

[73] Assignee: Dunlop Limited, England

[21] Appl. No.: 91,581

[22] Filed: Nov. 5, 1979

[51] Int. Cl.$^3$ ............................................. F16L 11/08
[52] U.S. Cl. ..................................... 138/133; 138/125; 138/126; 138/138; 138/143; 138/144; 138/153; 138/172; 138/174; 138/DIG. 2
[58] Field of Search ............... 138/124, 125, 126, 127, 138/130, 132, 133, 138, 143, 144, 153, 172, 174, DIG. 2

[56] References Cited

U.S. PATENT DOCUMENTS

| | | | |
|---|---|---|---|
| 1,281,557 | 10/1918 | Goodal | 138/133 |
| 1,831,724 | 11/1931 | Stokes | 138/133 X |
| 2,640,501 | 6/1953 | Scott et al. | 138/130 X |

FOREIGN PATENT DOCUMENTS 1407913  10/1975  United Kingdom ................ 138/133

*Primary Examiner*—James E. Bryant, III
*Attorney, Agent, or Firm*—Robert E. Burns; Emmanuel J. Lobato; Bruce L. Adams

[57] ABSTRACT

A steel reinforced pipe has a structural wall section sandwiched between inner and outer linings. The inner and outer linings each comprise resin-rich layers reinforced with glass or other fibers to impart the desired characteristics to the inner and outer pipe surfaces. The structural wall section comprises three or more structural steel reinforcing strips encapsulated with a structural epoxy resin and helically wound in the form of helical convolutions one over the other about the pipe axis such that the convolutions of each strip are axially separated from one another, by the epoxy resin, a distance not greater than 3 mm and radially separated from the convolutions of the next adjacent strip, by the epoxy resin, a distance not greater than 0.25 mm. The structural steel reinforcing strips preferably have a width between 100 mm and 200 mm and a thickness between 0.25 mm and 0.75 mm.

18 Claims, 2 Drawing Figures

STEEL REINFORCED PIPE

BACKGROUND OF THE INVENTION

The present invention relates generally to steel reinforced pipes and more particularly to pipes having a structural wall section comprised of a series of overlapping helical convolutions of structural steel reinforcing strips individually coated and bonded with a structural resin, the structural wall section being sandwiched between resin-rich inner and outer linings comprised of glass fibers impregnated with resin.

There is worldwide demand for a wide variety of pipes to fulfill the material-handling needs of industry. The annual mileage of pipeline laid has increased rapidly in recent years and considerable efforts have been made to develop an all-purpose pipe having the required properties to satisfy the diverse needs of industry. Coated steel pipes are presently in widespread use though suffer the drawbacks of being expensive to manufacture and costly to transport due to their weight. To overcome the drawbacks of coated steel pipes, reinforced plastic pipes have been developed as described, for example, in British Pat. No. 1,407,913. The present invention pertains to improvements in steel reinforced plastic pipe of the general type described in British Pat. No. 1,407,913.

SUMMARY OF THE INVENTION

It is accordingly one object of the present invention to provide a steel reinforced pipe which overcomes the major drawbacks of coated steel pipes and which overcomes the drawbacks of conventional steel reinforced plastic pipes.

Another object of the invention is to provide a steel reinforced pipe having a higher strength-to-weight ratio than similar size coated steel pipe.

A further object of the invention is to provide a steel reinforced pipe of considerably lighter weight than similar size coated steel pipe thereby simplifying and reducing the cost of shipping, handling and installing pipe systems.

A still further object of the inventin is to provide a steel reinforced pipe having excellent corrosion abrasion and chemical resistance and suitable mechanical properties to enable the pipe to be used for transporting water, sewage, chemical effluent, gas, oil and other materials.

Another object of the invention is to provide a steel reinforced pipe having an inner lining which presents exceptionally low flow resistance and an outer lining chosen to withstand extreme external environmental conditions.

Yet another object of the invention is to provide a steel reinforced pipe having comparable mechanical properties to conventional steel pipes and which is rugged and durable in nature and which can be easily manufactured in large quantities at economically feasible costs.

The above and other objects of the invention are achieved by a steel reinforced pipe having a structural wall section sandwiched between inner and outer linings. The inner and outer linings each comprise resin-rich layers reinforced with glass or other fibers to impart the desired characteristics to the inner and outer pipe surfaces. The structural wall section comprises three or more structural steel reinforcing strips coated with a structural resin and helically wound in the form of helical convolutions one over the other about the pipe axis such that the convolutions of each strip are axially spaced from adjacent convolutions of that strip a distance not greater than 3 mm by the structural resin and radially spaced from adjacent convolutions of the next adjacent strip a distance not greater than 0.25 mm by the structural resin. The structural steel reinforcing strips preferably have a width between 100 mm and 200 mm and a thickness between 0.25 mm and 0.75 mm.

Having in mind the above as well as other objects of the invention which will become apparent from a reading of this disclosure, the present invention comprises the construction and arrangement of parts as illustrated in the presently preferred embodiment which is hereinafter set forth in sufficient detail to enable those persons ordinarily skilled in the art to clearly understand the manner of making and using the invention when read in conjunction with the accompanying drawings.

DETAILED DESCRIPTION OF PREFERRED EMBODIMENT OF THE INVENTION

Figure 1:
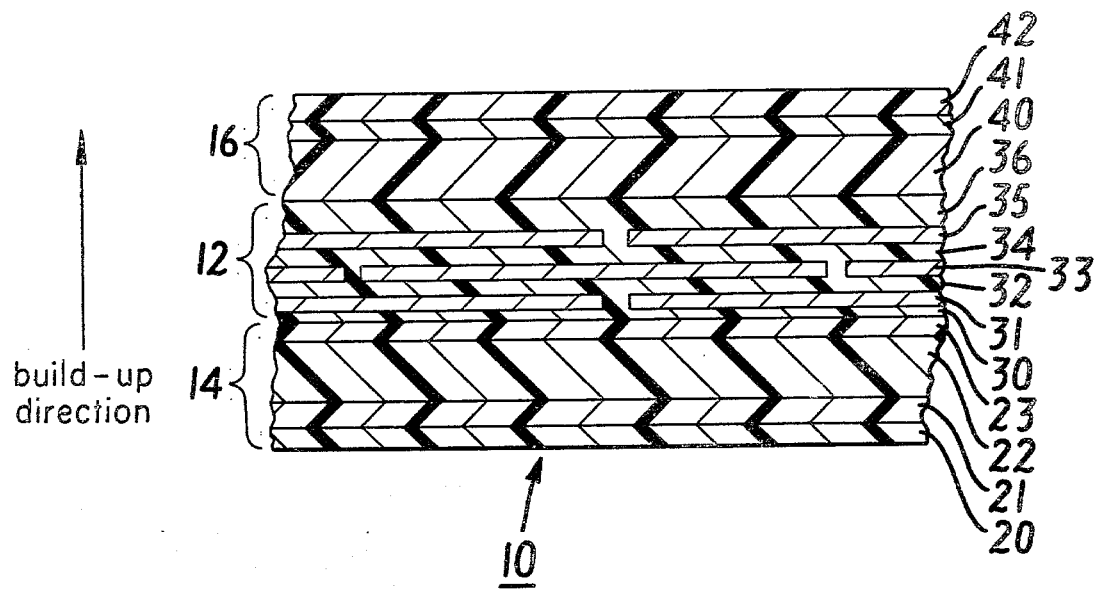
FIG. 1 is a longitudinal cross-sectional explanatory view, on an enlarged and disproportionate scale to more clearly show the pipe construction, of a section of steel reinforced pipe constructed according to the principles of the invention.
Figure 2:
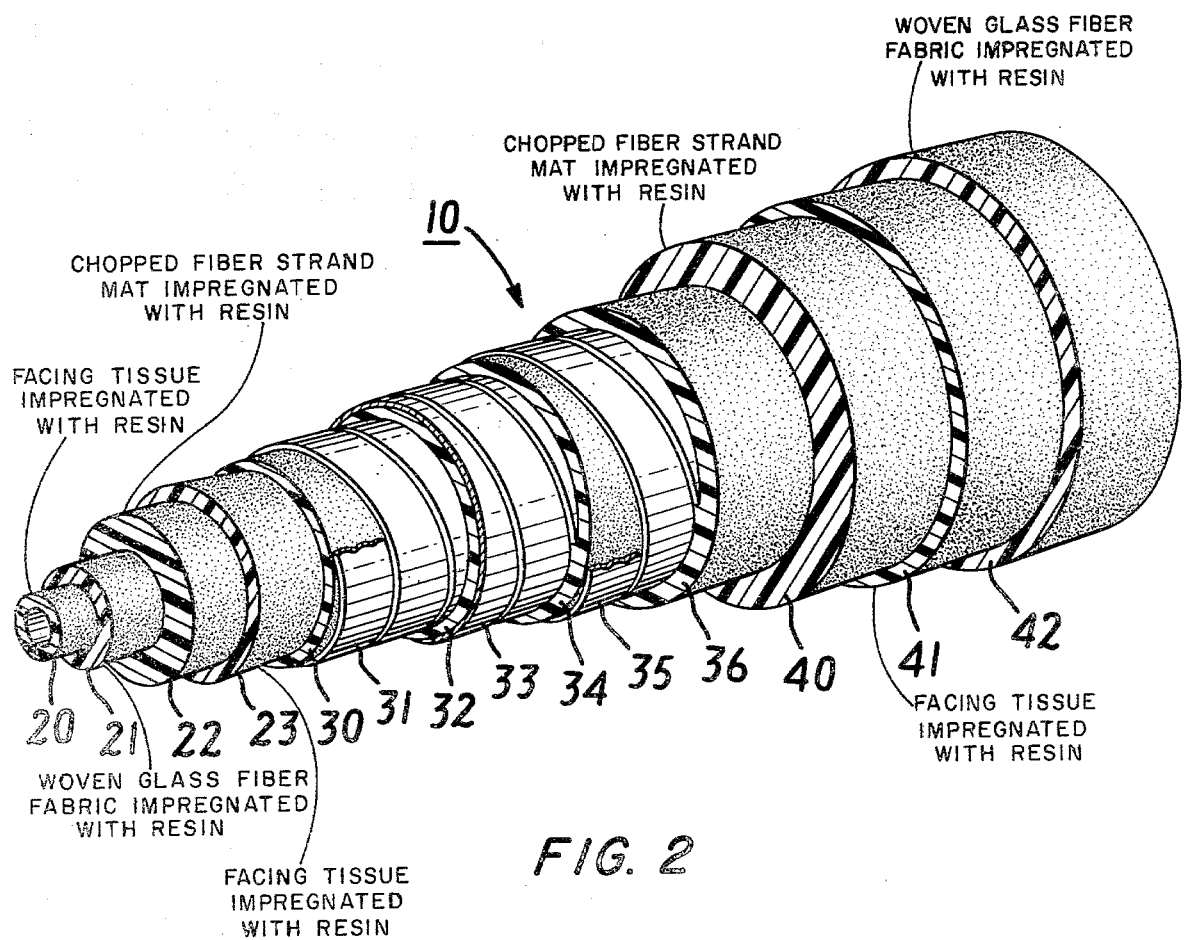
FIG. 2 is a perspective explanatory view, also on an enlarged and disproportionate scale, of a length of steel reinforced pipe according to the present invention.

The steel reinforced pipe shown in the drawings has not been drawn to scale and the thicknesses of the pipe layers have been exaggerated for ease of understanding and explanation. The steel reinforced pipe 10 comprises a structural wall section 12 sandwiched between inner and outer linings 14 and 16. The individual layers of the pipe are successively built up, one upon the other, on a mandrel of a pipe winding machine. The mandrel may be either collapsible or non-collapsible and is covered with a release agent to enable separation of the pipe from the mandrel. When a collapsible mandrel is used, the release agent preferably comprises a film such as melinex or the like which is helically wound on the mandrel and when a non-collapsible mandrel is used, a permanent release agent is baked on the mandrel surface. The inner lining 14 is then built up on the mandrel in the following manner.

First a layer of epoxy resin is sprayed onto the mandrel and during the spraying of the resin, a thin facing tissue 20 in the form of a fine facing cloth is wound onto the rotating mandrel surface and impregnated from underneath with the epoxy resin. The facing tissue 20 has a weight on the order of 50 gm/m$^2$ and is approximately 250 mm wide. Preferably, the facing tissue is helically wound with about a 10 mm overlap. After formation of the layer of facing tissue 20, another layer of epoxy resin is sprayed onto the facing tissue layer and during this spraying, a layer of woven glass fiber fabric 21 is wound over the resin-impregnated facing tissue layer 20. The woven glass fiber fabric layer 21 preferably comprises woven E Glass fabric having a weight of about 150–200 gm/m$^2$. The woven glass fiber fabric may be coated with an epoxy silane coating prior to winding on the facing tissue layer 20 in order to ensure compatability with the epoxy resin. The resin-impregnated layers 20 and 21 are then allowed to gel under heat for a 10-15 minute period to effect removal of any pinholes thereby ensuring a completely pinhole free structure.

After the gelling period, a further layer of epoxy resin is applied together with a layer of chopped fiber strand mat 22. The chopped fiber strand mat layer comprises powderbonded chopped fiber strands in mat form having a nominal weight on the order of 450 gm/m² and, if desired, the mat may be treated with an appropriate epoxy silane coating to ensure its compatability with the impregnating epoxy resin. The chopped fiber strand mat 22 has a width of about 220 mm and is helically wound so that adjacent windings abut one another without overlap. The mat is made to wet out from underneath to ensure that any trapped air is forced out of the mat thereby obtaining a pinhole free resin-impregnated chopped fiber strand mat layer. The inner lining 14 is completed by a bandaging layer of facing tissue 23 which is wound over the chopped fiber strand mat 22.

Next, the structural wall section 12 is built up on the inner lining 14. Initially a layer of structural epoxy resin 30 is sprayed over the facing tissue layer 23 of the inner lining after which a steel reinforcing strip 31 is helically wound in the form of helical convolutions about the longitudinal axis of the pipe over the resin-impregnated facing tissue layer 23. The steel reinforcing strip 31 is helically wound in such manner that adjacent helical convolutions are axially spaced from one another a prescribed amount so that a slight gap exists between adjacent helical convolutions of the strip. More structural epoxy resin is sprayed over the helically wound strip 31 to form a layer 32 and the gaps between adjacent helical convolutions of the strip are filled with the resin so that each helical convolution is completely coated and encapsulated with the structural epoxy resin. A second structural steel reinforcing strip 33 is then helically wound over the structural epoxy resin layer 32 in such manner that the helical convolutions of the strip 33 are axially offset from the helical convolutions of the strip 31 to ensure that the axial gaps between adjacent helical convolutions of the strip 31 are covered by the helical convolutions of the strip 33. In like fashion, further alternating layers of structural epoxy resin and structural steel reinforcing strips are built up over the preceding layers to complete the structural wall section 12. In the embodiment shown in the drawings, three steel reinforcing strips 31, 33 and 35 are shown interposed between epoxy resin layers 30, 32, 34 and 36 and depending upon the desired size and intended use of the pipe, from three to as many as twenty layers of steel reinforcing strips could be included. In each case, the helical convolutions of each strip are completely coated and encapsulated with the structural epoxy resin and the strips are helically wound one over the other about the longitudinal axis of the pipe with the helical convolutions of each strip being offset with respect to the helical convolutions of the next adjacent strip so that in cross section, such as shown in FIG. 1, the steel reinforcing strips appear in brickwork fashion.

The structural steel reinforcing strips preferably comprise low carbon cold rolled steel strips having a tensile strength of at least 540 N/mm². According to one feature of the invention, it has been found that best results are obtained by using strips having a thickness between 0.25 mm and 0.75 mm and a width between 100 mm and 200 mm. The axial separation between adjacent helical convolutions of each strip as well as the radial separation between the helical convolutions of successive strip layers are important dimensional parameters, and for steel reinforcing strips having a thickness and width within the aforementioned ranges, it has been found essential to maintain the thickness of the layers of structural epoxy resin between successive strip layers at 0.25 mm or less to obtain the optimum strength properties of the pipe. It has also been found necessary to maintain the axial separation between adjacent helical convolutions of each strip at a distance not greater than 3 mm, though this gap spacing may be somewhat greater than 3 mm for low pressure pipes. The extent of axial and radial separation between the steel strips and the extent of overlap of the helical convolutions of one strip with respect to those of adjacent strips are carefully selected to ensure that rupture or failure of the pipe occurs in the steel reinforcing strips (failure in tension) rather than in the structural epoxy resin at the interface between the resin and strips (failure in shear) thereby utilizing the maximum benefit of the steel reinforcement. The aforementioned British Pat. No. 1,407,913 describes the general relationship between the overlap width of adjacent steel strips and in accordance with the invention, the width of the steel strips and the axial gap width between adjacent helical convolutions of the strips are related to the minimum overlap width according to the relationship:

$$(W - X/2) \geq \text{minimum overlap width}$$

where W is the width of the steel strip and X is the axial gap width between adjacent helical convolutions of the steel strip.

The structural wall section 12 has a minimum of three layers of steel reinforcing strips and has a minimum stiffness (rigidity) of 0.9 kn/m² as determined by the relationship $$\text{stiffness} = (EI/D^3)$$

where E is the modulus of elasticity, I is the moment of inertia and D is the diameter. The stiffness value may increase substantially above 0.9 kn/m² for stiffer classes of pipe.

The structural epoxy resin which forms the resin layers 30, 32, 34 and 36 is preferably selected from the group consisting of aromatic amine cured or polyamide cured bisphenol A systems. In order to improve the bond strength between the epoxy resin and the steel reinforcing strips, the strip surfaces are chemically cleaned and shot blasted to roughen the surfaces and enable formation of a high adhesive strength bond with the epoxy resin.

The outer lining 16 is then built up on the structural wall section 12 in the following manner. A chopped fiber strand mat 40 is wound over the resin layer 36 while being sprayed with epoxy resin, then a layer of facing tissue 41 is wound over the resin-impregnated mat 40 while being sprayed with epoxy resin and lastly, a woven glass fiber fabric layer 42 is wound over the resin-impregnated facing tissue layer 41 while being sprayed with epoxy resin. The layers 40, 41 and 42 are all wetted out from underneath to force out any trapped air though no specific gelling period is needed. Instead, upon completion of the pipe build up, the pipe and mandrel are heat-cured at a temperature on the order of 140° C. for a period determined by the structure and size of the pipe. After curing, the mandrel is extracted and after finishing operations and inspection, the pipe is ready for shipping to the customer.

In accordance with the invention, the sequence of layers making up the inner and outer linings 14 and 16 is purposefully made different in order to impart the desired characteristics to the inner and outer surfaces of the pipe. The innermost layer of the pipe, the resin-impregnated facing tissue layer 20, provides a smooth surface having excellent hydraulic flow characteristics and the inner lining provides good abrasion and erosion properties as well as excellent corrosion and chemical resistance properties. The outermost layer of the pipe, the woven glass fiber fabric layer 42, provides a somewhat rough surface to facilitate handling and installation of the pipe and the outer lining provides excellent resistance to corrosion by all types of environmental conditions. The epoxy resin used in the inner and outer linings may be the same as the structural epoxy resin used in the structural wall section 12 and depending upon the intended use of the pipe, the linings can be formed with polyester resin instead of epoxy resin.

The manufacture of the pipe 10 may be done on site by transporting the pipe winding machine and accessories to the desired location. During formation of the pipe, the resin may be sprayed by any known technique and as used throughout the specification, the term "spraying" is used in its generic sense to encompass any manner of dispersing the resin in a generally uniform manner.

Pipes constructed according to the invention have a considerably higher strength-to-weight ratio than conventional steel pipes of the same size and up to a 50% weight saving can be achieved as compared to steel pipe. The inventive pipe has improved corrosion resistance properties as compared to coated steel pipes and has comparable mechanical properties to conventional steel pipes of similar size.

What I claim is:

1. A steel reinforced pipe comprising: an inner lining of tubular configuration comprised of distinct, successively wound layers of glass or other fibers impregnated with resin; a structural wall section of tubular configuration built up on said inner lining and comprised of at least three structural steel reinforcing strips each coated with a structural resin and each having a thickness between 0.25 mm and 0.75 mm, the structural steel reinforcing strips being helically wound in the form of helical convolutions one over the other about the longitudinal axis of the pipe with the convolutions of each strip being axially spaced from adjacent convolutions of that strip by the structural resin and being radially spaced from adjacent convolutions of the other strips by the structural resin; and an outer lining comprised of distinct, successively wound layers of glass or other fibers impregnated with resin built up on said structural wall section.

2. A steel reinforced pipe according to claim 1; wherein said structural steel reinforcing strips have a width between 100 mm and 200 mm.

3. A steel reinforced pipe according to claim 1; wherein said structural steel reinforcing strips comprise low carbon cold rolled steel strips having a tensile strength of at least 540 N/mm$^2$.

4. A steel reinforced pipe according to any one of claims 1, 2 and 3; wherein the helical convolutions of each strip are radially spaced from the helical convolutions of the next adjacent strip a distance not greater than 0.25 mm.

5. A steel reinforced pipe according to claim 4; wherein adjacent helical convolutions of each strip are axially spaced from one another a distance not greater than 3 mm.

6. A steel reinforced pipe according to claim 1; wherein said inner lining comprises a layer of woven glass fiber fabric impregnated with resin, and a layer of chopped fiber strand mat impregnated with resin built up on said woven glass fiber fabric layer.

7. A steel reinforced pipe according to claim 6; wherein said woven glass fiber fabric comprises woven E Glass fabric having a weight of 150–200 gm/m$^2$.

8. A steel reinforced pipe according to claim 6; wherein said chopped fiber strand mat has a weight on the order of 450 gm/m$^2$.

9. A steel reinforced pipe according to claim 6; wherein said inner lining further includes a layer of facing tissue impregnated with resin and on which is built up said woven glass fiber fabric layer.

10. A steel reinforced pipe according to claim 9; wherein said facing tissue comprises a continuous filament polyester material having a weight on the order of 50 gm/m$^2$.

11. A steel reinforced pipe according to claim 1; wherein said outer lining comprises a layer of chopped fiber strand mat impregnated with resin built up on said structural wall section, and a layer of woven glass fiber fabric impregnated with resin built up on said chopped fiber strand mat.

12. A steel reinforced pipe according to claim 11; wherein said chopped fiber strand mat has a weight on the order of 450 gm/m$^2$.

13. A steel reinforced pipe according to claim 11; wherein said woven glass fiber fabric comprises woven E Glass fabric having a weight of 150–200 gm/m$^2$.

14. A steel reinforced pipe according to claim 11; wherein said outer lining further includes a layer of facing tissue impregnated with resin interposed between said layers of chopped fiber strand mat and woven glass fiber fabric.

15. A steel reinforced pipe according to any one of claims 1, 6 and 11; wherein said structural resin comprises an epoxy resin selected from the group consisting of aromatic amine cured or polyamide cured bisphenol A systems.

16. A steel reinforcing pipe according to claim 15; wherein the pipe has a diameter on the order of 200 mm.

17. A steel reinforced pipe according to claim 15 wherein the pipe has a diameter on the order of 2000 mm.

18. A steel reinforced pipe according to claim 15; wherein the pipe structural wall section has a minimum stiffness of 0.9 kn/m$^2$.

* * * * *